(12) United States Patent
Suzuki et al.

(10) Patent No.: US 9,827,815 B2
(45) Date of Patent: Nov. 28, 2017

(54) TIRE DEVICE

(71) Applicants: DENSO CORPORATION, Kariya, Aichi-pref. (JP); NIPPON SOKEN, INC., Nishio, Aichi-Pref. (JP)

(72) Inventors: Youichirou Suzuki, Okazaki (JP); Takashi Saitou, Okazaki (JP); Akira Takaoka, Okazaki (JP); Nobuya Watabe, Nagoya (JP); Takatoshi Sekizawa, Kariya (JP); Masashi Mori, Obu (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 66 days.

(21) Appl. No.: 14/776,220

(22) PCT Filed: Mar. 11, 2014

(86) PCT No.: PCT/JP2014/001362
§ 371 (c)(1),
(2) Date: Sep. 14, 2015

(87) PCT Pub. No.: WO2014/141690
PCT Pub. Date: Sep. 18, 2014

(65) Prior Publication Data
US 2016/0031273 A1 Feb. 4, 2016

(30) Foreign Application Priority Data
Mar. 15, 2013 (JP) .................. 2013-053711

(51) Int. Cl.
B60C 19/00 (2006.01)
B60C 23/06 (2006.01)
(Continued)

(52) U.S. Cl.
CPC ............ *B60C 23/065* (2013.01); *B60C 19/00* (2013.01); *B60C 23/0411* (2013.01);
(Continued)

(58) Field of Classification Search
CPC . B60C 23/065; B60C 23/0411; B60C 23/064; B60C 2019/004
See application file for complete search history.

(56) References Cited

U.S. PATENT DOCUMENTS

2005/0134444 A1 6/2005 Park et al.
2006/0111853 A1* 5/2006 Ogawa ................. B60C 23/065
702/35

(Continued)

FOREIGN PATENT DOCUMENTS

JP H09-237398 A 9/1997
JP 2003-065871 A 3/2003
(Continued)

OTHER PUBLICATIONS

Abstract cover page, english translation, and original document of JP 2003-065871, in Applicant's IDS filed Sep. 14, 2015.*
(Continued)

*Primary Examiner* — R. A. Smith
*Assistant Examiner* — John M Royston
(74) *Attorney, Agent, or Firm* — Harness, Dickey & Pierce, P.L.C.

(57) ABSTRACT

A tire device includes a vibration power generating element, a signal processing unit, and a transmitter. The vibration power generating element is arranged inside a tire and outputs a voltage corresponding to a time variation of a vibration generated in a tread of the tire. The signal processing unit is disposed inside the tire and performs signal processing on the voltage outputted from the vibration power generating element. The transmitter is arranged inside
(Continued)

the tire and sends data subjected to the signal processing in the signal processing unit to a device provided outside the tire. The signal processing unit and the transmitter are driven by power generated in the vibration power generating element.

9 Claims, 3 Drawing Sheets

(51) Int. Cl.
  *B60C 23/04* (2006.01)
  *B60T 8/172* (2006.01)
(52) U.S. Cl.
  CPC .......... *B60C 23/064* (2013.01); *B60T 8/1725* (2013.01); *B60C 2019/004* (2013.01)

(56) References Cited

U.S. PATENT DOCUMENTS

| | | | |
|---|---|---|---|
| 2006/0201240 | A1 | 9/2006 | Morinaga |
| 2007/0107505 | A1 | 5/2007 | Schillinger et al. |
| 2009/0105921 | A1* | 4/2009 | Hanatsuka ......... B60G 17/0165 701/80 |
| 2010/0126263 | A1 | 5/2010 | Brusarosco et al. |
| 2012/0318056 | A1* | 12/2012 | Izumi ................... G01L 9/0008 73/146.3 |

FOREIGN PATENT DOCUMENTS

| | | |
|---|---|---|
| JP | 2005-186930 A | 7/2005 |
| JP | 2005-306160 A | 11/2005 |
| JP | 2007-514176 A | 5/2007 |
| JP | 2007-137086 A | 6/2007 |
| JP | 2010-032355 A | 2/2010 |
| JP | 2010-243305 A | 10/2010 |
| JP | 2010-533844 A | 10/2010 |
| JP | 2011-221002 A | 11/2011 |
| JP | 2012-218682 A | 11/2012 |
| WO | WO-2005-016670 A1 | 2/2005 |
| WO | WO-2015141152 A1 | 9/2015 |
| WO | WO-2015141199 A1 | 9/2015 |
| WO | WO-2015141200 A1 | 9/2015 |
| WO | WO-2015141201 A1 | 9/2015 |
| WO | WO-2015174031 A1 | 11/2015 |

OTHER PUBLICATIONS

International Search Report and Written Opinion for PCT/JP2014/001362 (in English and Japanese), dated May 27, 2014; ISA/JP.

* cited by examiner

TIRE DEVICE

CROSS REFERENCE TO RELATED APPLICATIONS

This application is a U.S. National Phase Application under 35 U.S.C. 371 of International Application No. PCT/JP2014/001362 filed on Mar. 11, 2014 and published in Japanese as WO 2014/141690 A1 on Sep. 18, 2014. This application is based on and claims the benefit of priority from Japanese Patent Application No. 2013-53711 filed on Mar. 15, 2013. The entire disclosures of all of the above applications are incorporated herein by reference.

TECHNICAL FIELD

The present disclosure relates to a device that estimates conditions of a tire from a detection value of a sensor attached to the tire.

BACKGROUND ART

A tire device to estimate conditions of a tire is used in the related art (for example, Patent Literature 1). According to the technique disclosed in Patent Literature 1, the tire device includes an acceleration sensor disposed at a tread of a tire (a portion of the tire that comes into contact with a road surface) inside the tire and detects a vibration generated in the tread portion from an output value of the acceleration sensor. The tire device estimates a coefficient of friction between the tire and the road surface from a time variation of a detected vibration level.

Also, besides a sensor used to estimate tire conditions, such as the acceleration sensor, the tire device generally includes a microcomputer and a transmitter inside the tire. Hence, the tire device processes data detected by the sensor and sends data to a device outside the tire. The tire device therefore requires power to drive the microcomputer and the transmitter and includes a battery cell inside the tire due to a difficulty of supplying power to the transmitter and the like inside the tire from a power supply (for example, a car battery) outside the tire.

PRIOR ART LITERATURES

Patent Literature

Patent Literature 1: JP 2005-306160 A

SUMMARY OF INVENTION

The technique in the related art, however, requires the battery cell inside the tire and a device inside the tire is increased in size corresponding to a size of the battery cell.

In view of the foregoing, the present disclosure has an object to provide a tire device that further reduces a size of a device attached inside a tire.

A tire device according to an aspect of the present disclosure includes: a vibration power generating element disposed inside a tire and configured to output a voltage corresponding to a time variation of a vibration generated in a tread of the tire; a signal processing unit disposed inside the tire and configured to perform signal processing on an output voltage of the vibration power generating element; and a transmitter disposed inside the tire and configured to send data as a result of the signal processing in the signal processing unit to a device provided outside the tire. The signal processing unit and the transmitter are driven by power generated in the vibration power generating element.

According to the configuration as above, the vibration power generating element generates power in response to a vibration generated in the tread and the signal processing unit and the transmitter inside the tire are driven by the power generated in the vibration power generating element. Hence, the vibration power generating element plays a role of outputting a signal corresponding to a time variation of the vibration and also plays a role of supplying power to drive the signal processing unit inside the tire. The configuration as above eliminates the need to provide a separate battery cell inside the tire to drive the signal processing unit and the transmitter. Hence, among members forming the tire device, a member attached inside the tire can be reduced in size.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
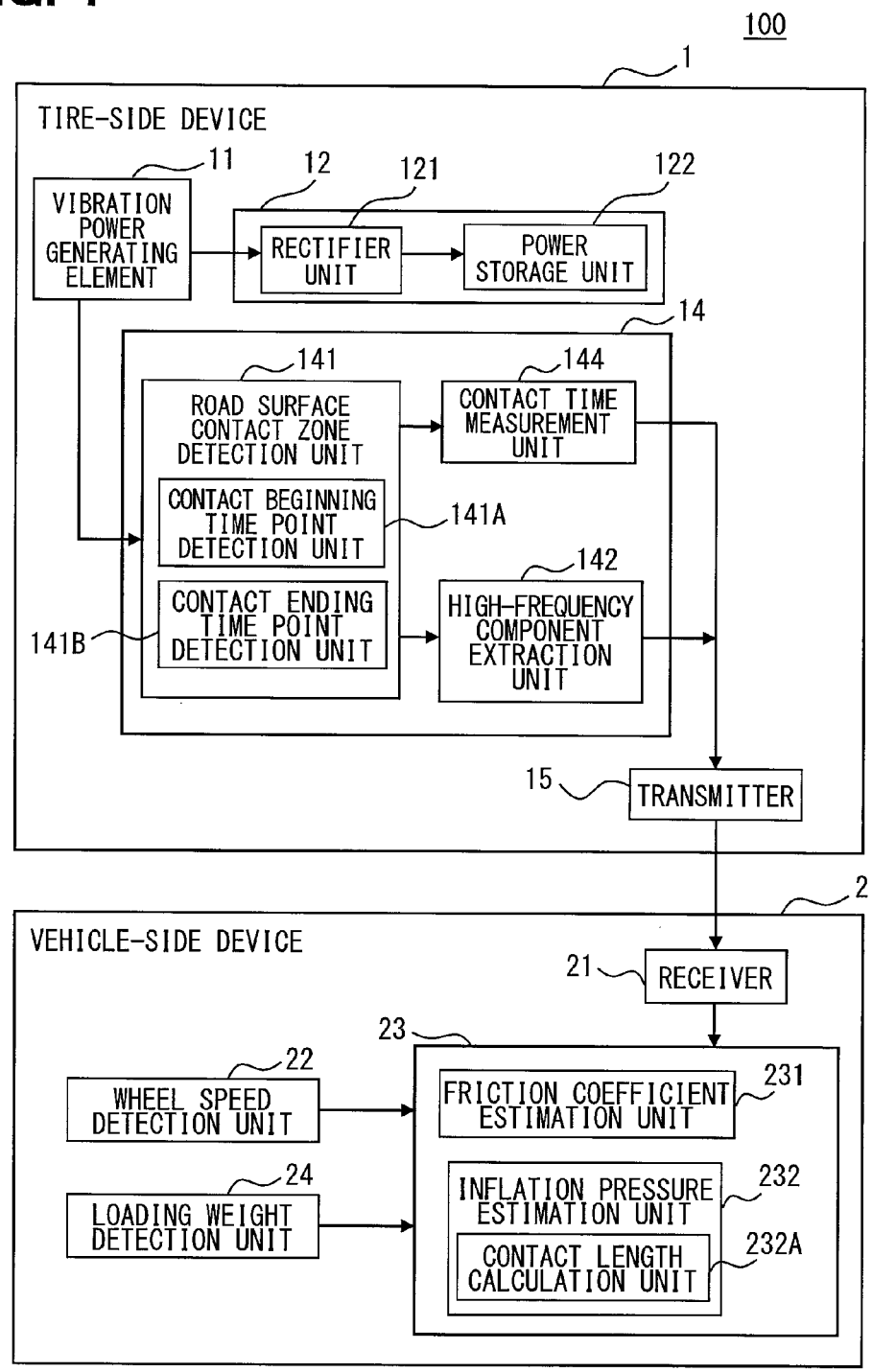
FIG. 1 is a block diagram used to describe a configuration of a tire device according to an embodiment of the present disclosure.
Figure 2:
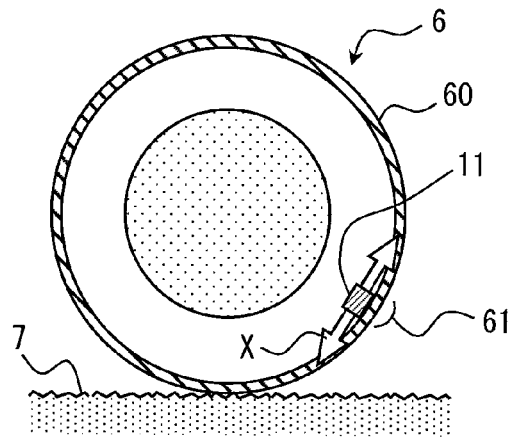
FIG. 2 is a radial sectional view of a tire provided with a tire-side device according to the embodiment when viewed from sideways.

Hereinafter, embodiments of the present disclosure will be described according to FIG. 1 through FIG. 6. FIG. 1 is a block diagram used to describe a configuration of a tire device 100 of the present embodiment. As is shown in FIG. 1, the tire device 100 includes a tire-side device 1 and a vehicle-side device 2. The tire-side device 1 includes a vibration power generating element 11, a power supply circuit 12, a signal processing unit 14, and a transmitter 15. The vehicle-side device 2 includes a receiver 21, a wheel speed detection unit 22, a signal processing unit 23, and a loading weight detection unit 24.

An operation of the tire device 100 of the present embodiment is briefly described as follows. That is, the tire-side device 1 provided inside a tire 6 detects a vibration generated in a tread 60 of the tire 6 and sends various types of data, which are obtained from a time variation of amplitude of the vibration, to the vehicle-side device 2. The vehicle-side device 2 calculates a coefficient of friction between a road surface 7 and the tire 6 and an inflation pressure of the tire 6 on the basis of the data acquired from the tire-side device 1 and data on a wheel speed and the like. The calculated data on the coefficient of friction between the road surface 7 and the tire 6 and the inflation pressure of the tire 6 is used for control processing performed in various control systems, such as an ABS (Anti-locked Braking System). The devices above and functions thereof will be described more in detail below. Hereinafter, a vehicle equipped with the tire device 100 will be referred to as the own vehicle.

Figure 3:
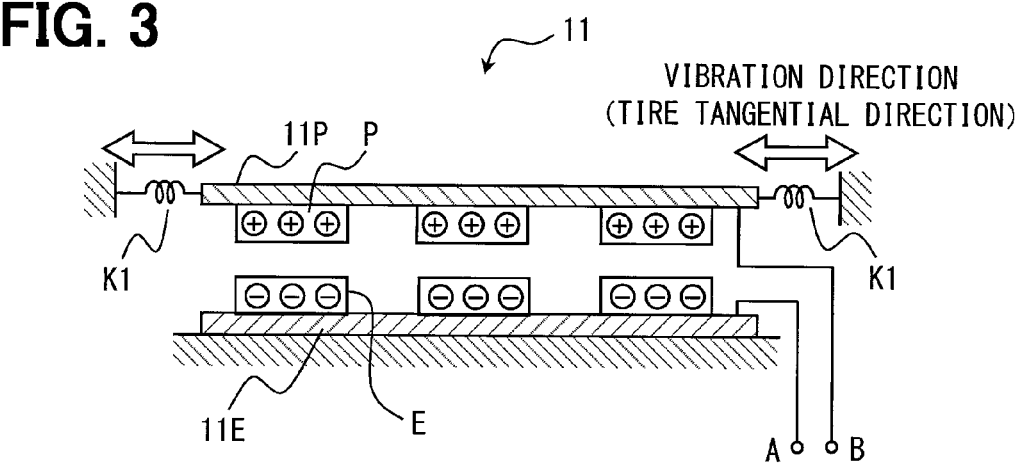
FIG. 3 is a schematic view used to describe a configuration of a vibration power generating element according to the embodiment.

The tire-side device 1 is disposed on a back side of a tread of the tire 6 (a surface that comes into contact with the road surface 7 is deemed as a front surface) equipped to the own vehicle in the vicinity of a center in a width direction of the tire (hereinafter, referred to as the tire width direction). The vibration power generating element 11 provided to the tire-side device 1 converts vibrational energy to electric energy and is disposed in such a manner so as to generate power in response to a vibration in a direction tangent to a circular orbit that the tire-side device 1 forms when the tire 6 rotates (tire tangential direction, that is, a direction indicated by an arrow X in FIG. 2). FIG. 3 shows a sectional view of the tire 6 in a radial direction when viewed from sideways used to describe a configuration of the vibration power generating element 11. In the present embodiment, the vibration power generating element 11 is a static induction power generation element. However, the vibration power generating element 11 may be a piezoelectric element or a frictional, magnetostrictive, or electromagnetic induction element instead.

The vibration power generating element 11 includes electret electrodes E, an electret electrode substrate 11E, counter electrodes P, and a counter electrode substrate 11P. The electret electrode E holds a certain charge semi-permanently and holds a negative charge herein.

On a surface of the electret electrode substrate 11E, the electret electrodes E shaped like a strip are provided so as to extend in the tire width direction while the respective electret electrodes E are disposed parallel to the tire tangential direction. Likewise, on a surface of the counter electrode substrate 11P, the counter electrodes P shaped like a strip are provided so as to extend in the tire width direction and disposed parallel to the tire tangential direction. Widths of the counter electrodes P and the electret electrodes E in the tire tangential direction are the same. It goes without saying that the widths of these electrodes are designed appropriately.

The electret electrode substrate 11E and the counter electrode substrate 11P are disposed so as to make the electret electrodes E arranged on the electret electrode substrate 11E and the counter electrodes P arranged on the counter electrode substrate 11P opposite to each other. The electret electrode substrate 11E is fixed immovably to a casing of the tire-side device 1. In contrast, as is shown in FIG. 3, the counter electrode substrate 11P is attached to the casing of the tire-side device 1 at both ends in the tire tangential direction with springs K1 having a predetermined spring constant. The counter electrode substrate 11P therefore chiefly moves parallel to the tire tangential direction. The spring constant of the springs K1 is set for the counter electrode substrate 11P to vibrate sensitive enough in response to a vibration generated in the tread 60 at a frequency of 10 Hz to 10 kHz.

Negative charges are accumulated in the electret electrodes E. Hence, positive charges are induced to the counter electrodes P by static induction while the electret electrodes E and the counter electrodes P are opposed to each other. An amount of charges induced to the respective counter electrodes P by static induction varies with a relative movement of the counter electrode substrate 11P in the tire tangential direction with respect to the electret electrode substrate 11E. Consequently, a potential difference comparable to a variance in amount of charges is generated between terminals A and B.

When the own vehicle is running, a vibration is generated in the tread 60 of the tire 6 due to various factors, such as rotational motion of the tire and irregularities of the road surface. The counter electrode substrate 11P vibrates in the tire tangential direction as the vibration generated in the tread 60 transmits to the vibration power generating element 11. An amount of charges induced to the respective counter electrodes P varies with a vibration of the counter electrode substrate 11P and AC power is generated between the terminals A and B. It goes without saying that AC power generated between the terminals A and B becomes larger as amplitude of the vibration of the counter electrode substrate 11P becomes wider and a frequency of the AC power becomes higher as a frequency of the vibration becomes higher. In short, a voltage outputted from the vibration power generating element 11 corresponds to a vibration generated in the tread 60. Hence, a time variation of a vibration being generated in the tread 60 can be estimated from a time variation of an output voltage of the vibration power generating element 11. The terminals A and B are connected, respectively, to the power supply circuit 12 and the signal processing unit 14 described below.

The power supply circuit 12 is a circuit that supplies power generated in the vibration power generating element 11 to the signal processing unit 14 and the transmitter 15, and includes a rectifier unit 121 and a power storage unit 122. The rectifier unit 121 is a known rectifier circuit to convert AC power outputted from the vibration power generating element 11 to DC power. AC power generated in the vibration power generating element 11 is converted to DC power in the rectifier unit 121 and outputted to the power storage unit 122. The rectifier unit 121 can be either a full-wave rectifier circuit or a half-wave rectifier circuit.

The power storage unit 122 is a circuit to store DC power inputted therein from the rectifier unit 121 and chiefly formed of a capacitor. Power generated in the vibration power generating element 11 is supplied to the signal processing unit 14 and the transmitter 15 provided to the tire-side device 1 via the rectifier unit 121 and the power storage unit 122. By providing the power storage unit 122 to the power supply circuit 12, when the vibration power generating element 11 generates extra power, the extra power can be stored and when an amount of power generation becomes short, the stored power can be used to compensate for the shortage.

The signal processing unit 14 chiefly includes a microcomputer. The signal processing unit 14 also includes a CPU, memories, such as a ROM, a RAM, and an EEPROM, an I/O interface, and a bus interconnecting the foregoing components, all of which are known components. The signal processing unit 14 performs processing to extract data necessary to estimate a coefficient of friction between the road surface 7 and the tire 6 and an inflation pressure of the tire 6 from a time variation of a voltage successively inputted therein from the vibration power generating element 11. As a function to perform the processing as above, the signal processing unit 14 includes a road surface contact zone detection unit 141, a high-frequency component extraction unit 142, and a contact time measurement unit 144. Hereinafter, data on a time variation of an output voltage of the vibration power generating element 11 is used as vibration data.

The road surface contact zone detection unit 141 detects a time point at the beginning of contact when a tread portion where the tire-side device 1 is attached (hereinafter, referred to as an attachment portion 61) makes contact with the road surface 7 and a time point at the end of contact when the the attachment portion 61 lifts off the road surface 7 during a rotation of the tire 6 from the vibration data acquired from the vibration power generating element 11. A period from the beginning to the end of contact between the attachment portion 61 and the road surface is detected as a zone (road surface contact zone) during which the attachment portion 61 is in contact with the road surface. The time point (at the beginning of contact) when the attachment portion 61 of the tread 60 makes contact with the road surface 7 and the time point (at the end of contact) when the attachment portion 61 lifts off the road surface 7 are detected as follows.

Figure 4:
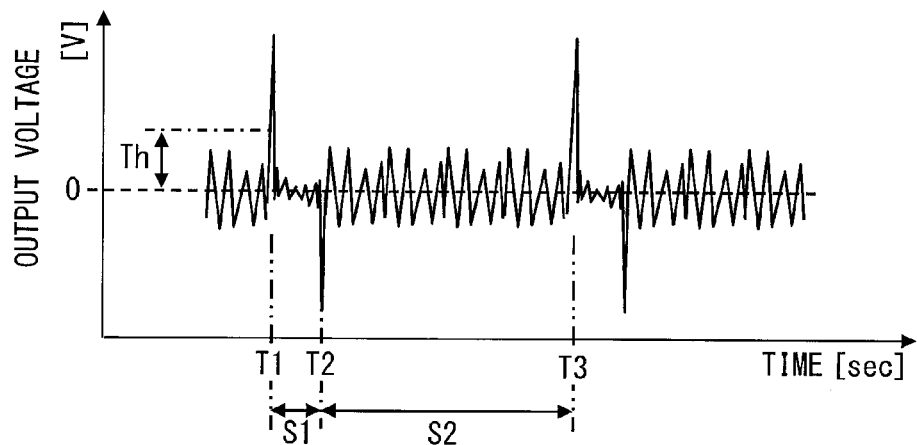
FIG. 4 is a chart showing a time variation of a voltage outputted from the vibration power generating element.
Figure 5:
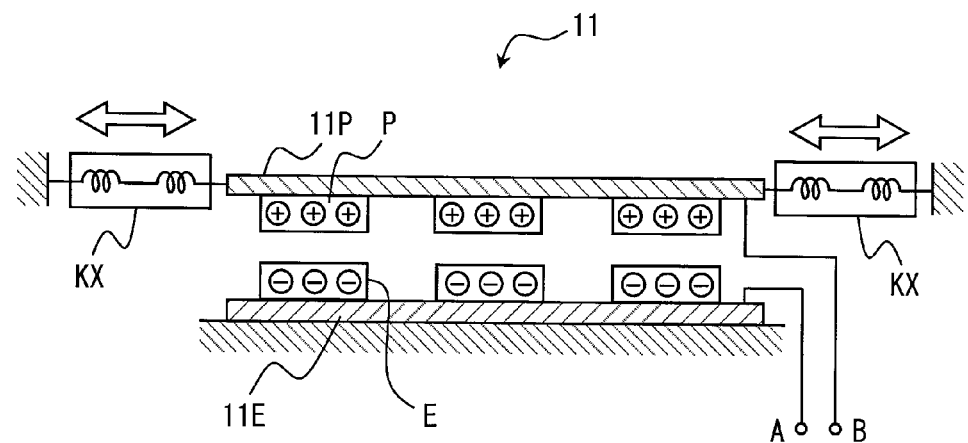
FIG. 5 is a view showing an example of another configuration of the vibration power generating element.

When the vehicle is running, the counter electrode substrate 11P of the vibration power generating element 11 receives a vibration generated in the tread 60 and vibrates in the tire tangential direction. The vibration power generating element 11 outputs a voltage corresponding to a speed and a frequency when the counter electrode substrate 11P vibrates in the tire tangential direction. A conceptual diagram of a time variation of an output voltage of the vibration power generating element 11 (namely, the vibration data) is set forth in FIG. 4. In FIG. 4, T1 indicates a time point when the attachment portion 61 where the tire-side device 1 is attached makes contact with the road surface 7 during a rotation of the tire 6. Also, T2 indicates a time point when the attachment portion 61 lifts off the road surface 7.

Output voltages of the vibration power generating element 11 at T1 and T2 have wider amplitude than output voltages before and after T1 and T2 for the reason as follows. That is, when the attachment portion 61 of the tire-side device 1 in the tread 60 makes contact with the road surface 7 during a rotation of the tire 6, the vicinity of the attachment portion 61, which is substantially a cylindrical surface, is compressed and deformed to a flat surface. An output voltage at T1 becomes larger than an output voltage immediately preceding T1 due to an impact given at the compression. When the vicinity of the attachment portion 61 lifts off the road surface, the attachment portion 61 is freed from the compression and restores to substantially the cylindrical surface from the flat surface. An output voltage at T2 becomes larger than an output voltage following T2 due to an impact given at restoration to the original shape when freed from the compression. A direction of impact given at compression and a direction of impact given when freed from the compression are opposite and so are the signs of the output voltage. During a period since the attachment portion 61 lifts off the road surface 7 until the attachment portion 61 again makes contact with the road surface 7 (at S2 of FIG. 4), a vibrational component in the tire tangential direction in the attachment portion 61 is detected from a vibration in a direction vertical to the road surface generated due to irregularities of the road surface 7.

On the basis of a time variation of a vibration generated in the tread 60 as above, the road surface contact zone detection unit 141 determines the beginning and the end of contact between the attachment portion 61 and the road surface 7 when an output voltage of the vibration power generating element 11 becomes as high as or higher than a predetermined threshold Th. The threshold Th may be set appropriately by conducting tests or the like and set, for example, to be twice as large as a mean value of the amplitude that is outputted when the vehicle is running. The road surface contact zone detection unit 141 that performs the processing to detect a time point at the beginning of contact is a contact beginning time point detection unit 141A and the road surface contact zone detection unit 141 that performs the processing to detect a time point at the end of contact is a contact beginning time point detection unit 141B.

The high-frequency component extraction unit 142 extracts a high-frequency component (i.e., high-frequency vibration data) in a portion corresponding to a period from the beginning to the end of contact detected in the road surface contact zone detection unit 141 from the vibration data of the vibration power generating element 11, and outputs the extracted data to the transmitter 15. In the present embodiment, a wavelet filter is used as the high-frequency component extraction unit 142. However, other known high-pass filters are also available. The contact time measurement unit 144 measures a time from the beginning to the end of contact detected in the road surface contact zone detection unit 141 and outputs the contact time (S1 of FIG. 4) to the transmitter 15.

Data (i.e., detection data) generated in the signal processing unit 14 as above, including the high-frequency component of the vibration data from the beginning to the end of contact and the contact time S1, is sent to the vehicle-side device 2 via the transmitter 15. Communications between the transmitter 15 and the receiver 21 provided to the vehicle-side device 2 may be made by a known near field communication technique, such as Bluetooth (registered trademark). Timing at which to send the detection data in the present embodiment is during the contact time S1 or when the high-frequency vibration data is generated once in every rotation of the tire 6. Alternatively, it may be configured as another embodiment in such a manner that data of more than one rotation is accumulated and sent collectively later. In such a case, an operation rate of the transmitter 15 can be restricted and hence power consumed in the transmitter 15 can be reduced.

The vehicle-side device 2 is provided to the own vehicle outside the tire 6, and includes the receiver 21, the wheel speed detection unit 22, the signal processing unit 23, and the loading weight detection unit 24. The receiver 21 is a device to receive the detection data sent from the transmitter 15 provided to the tire-side device 1. The detection data received at the receiver 21 is successively outputted to the signal processing unit 23 each time the detection data is received.

The wheel speed detection unit 22 is a known wheel speed sensor that detects a rotation speed of the wheel and outputs a rotation speed of the tire 6 to the signal processing unit 23. The wheel speed detection unit 22 may be of, for example, a type that detects a change in magnetic flux caused by teeth provided along an outer periphery of a rotor rotating with an axle using a pick-up coil or a hole element.

The loading weight detection element 24 detects a loading weight of the own vehicle and outputs the loading weight to the signal processing unit 23. The loading weight detection unit 24 may be configured as disclosed in, for example, JP 2010-243305 A, that is, configured so as to estimate a loading weight from states of a gear and an accelerator, an engine rotation speed, acceleration of the vehicle, and so on. Other known loading weight sensors are also available.

The signal processing unit 23 is chiefly formed of a microcomputer. The signal processing unit 23 also includes a CPU, memories, such as a ROM, a RAM, and an EEPROM, an I/O interface, and a bus interconnecting the forgoing components, all of which are known components. The detection data is inputted successively into the signal processing unit 23 from the receiver 21. Also, a wheel speed of the tire 6 is inputted successively (for example, every 100 milliseconds) into the signal processing unit 23 from the wheel speed detection unit 22. The signal processing unit 23 performs processing to estimate a coefficient of friction between the road surface 7 and the tire 6 and an inflation pressure of the tire 6 from the various types of data. As a function to perform the processing as above, the signal processing unit 23 includes a friction coefficient estimation unit 231 and an inflation pressure estimation unit 232.

The friction coefficient estimation unit 231 estimates a coefficient of friction between the road surface 7 and the tire 6 by comparing an amplitude level at the end of contact in the high-frequency vibration data with a predetermined threshold (i.e., friction determination threshold). As is disclosed in Patent Literature 1, waveforms of a vibration generated in the tread 60 are different between a road surface having a high coefficient of friction, such as a dry asphalt road surface, and a road surface having a low coefficient of friction. Estimation is made by paying attention to the fact that a difference of the amplitude levels of high-frequency components is particularly noticeable at the end of contact. The friction determination threshold may be determined in advance by conducting tests or the like so as to distinguish an amplitude level in the zone (at S2 of FIG. 4) in which the attachment portion 61 is not in contact with the road surface 7 from an amplitude level at the beginning of contact (at T1) or the end of contact (at T2).

In view of the foregoing, the friction coefficient estimation unit 231 compares the amplitude level at the end of contact in the high-frequency vibration data with the friction determination threshold determined in advance from tests or the like. When the high-frequency amplitude level at the end of contact is higher than the friction determination threshold, it is determined that a coefficient of friction between the road surface 7 and the tire 6 is high. When the amplitude level at the end of contact in the high-frequency vibration data is lower than the friction determination threshold, it is determined that a coefficient of friction between the road surface 7 and the tire 6 is low. Alternatively, it may be configured in such a manner that the friction coefficient estimation unit 231 preliminarily stores a table indicating a correspondence relation between a coefficient of friction and the amplitude level at the end of contact and estimates a coefficient of friction corresponding to an amplitude level at the end of contact from the correspondence relation.

A vibration generated in the tread 60 is considerably influenced by a wheel speed in addition to a coefficient of friction with the road surface 7. For example, amplitude of a vibration generated at the end of contact of the attachment portion 61 becomes wider as a wheel speed becomes higher. As a matter of course, whether a wheel speed is high or low has an influence on vibration amplitude not only at the end of contact but also at the beginning of contact. Hence, the amplitude level at the end of contact in the high-frequency vibration data may be corrected in the friction coefficient estimation unit 231 using a wheel speed acquired in the wheel speed detection unit 22 and an amplitude level at the beginning of contact. In such a case, an influence of the wheel speed on a coefficient of friction is reduced by correcting the amplitude level at the end of contact to be lower as a wheel speed becomes higher. Alternatively, it may be configured in such a manner that a reference amplitude level at the beginning of contact is set in advance as a reference of the amplitude level at the beginning of contact. In such a case, the amplitude level at the end of contact is corrected according to deviation of the actually detected amplitude level at the beginning of contact from the reference amplitude level at the beginning of contact. Further, a coefficient of friction may be estimated from the corrected high-frequency amplitude level at the end of contact and the friction determination threshold. The coefficient of friction estimated in the friction coefficient estimation unit 231 is outputted to various control systems, such as the ABS system.

The inflation pressure estimation unit 232 estimates an inflation pressure of the tire 6 from the contact time S1 and the wheel speed. Firstly, a contact length calculation unit 232A provided to the inflation pressure estimation unit 232 calculates a running speed of the own vehicle from the wheel speed and calculates a length (i.e., contact length) in a moving direction over which the tire 6 is in contact with the road surface from the running speed and the contact time S1. For example, given 60 km/h as the running speed and 60 milliseconds as the contact time S1, then the contact length can be found to be 10 cm.

Assume that the contact length (i.e., reference contact length) at a normal inflation pressure is 10 cm. Then, when an inflation pressure of the tire 6 drops, the contact length becomes longer than 10 cm. Accordingly, the inflation pressure estimation unit 232 compares the pre-set reference contact length under normal condition with a contact length calculated from the detected contact time S1 and the detected wheel speed. When the calculated contact length is longer than the reference contact length, it is estimated that an inflation pressure has dropped by a quantity corresponding to the difference. On the contrary, when the calculated contact length is shorter than the reference contact length, it is estimated that an inflation pressure has risen by a quantity corresponding to the difference. A value preliminarily set by conducting tests or the like may be used as the reference contact length and it goes without saying that the reference contact length is not limited to the value specified above.

More than one reference contact length may be set. For example, two types of reference contact length may be set. Assume that one is a first reference contact length (for example, 12 cm) and the other is a second reference contact length (for example, 8 cm, that is, second reference contact length<first reference contact length). When the contact length is longer than the first reference contact length, it is estimated that the inflation pressure is below a normal inflation pressure. When the contact length takes a value between the first reference contact length and the second reference contact length, it is estimated that the inflation pressure is normal. When the contact length is shorter than the second reference contact length, it is estimated that the inflation pressure is too high. It may be configured in such a manner that the inflation pressure estimation unit 232 preliminarily stores a table indicating a correspondence relation between a contact length and an inflation pressure and estimates an inflation pressure corresponding to a contact length from the correspondence relation.

The contact length is influenced by a load (including a loading weight which is a weight of baggage loaded on the vehicle and an occupant(s) riding in the vehicle and a weight of the own vehicle) applied to the tire. In particular, a loading weight is different from a weight of the own vehicle in that it varies each time the own vehicle runs. Hence, it may be configured in such a manner that the inflation pressure estimation unit 232 corrects the reference contact length using a loading weight of the vehicle acquired from the loading weight detection unit 24 and estimates an inflation pressure using the corrected reference contact length. For example, when a current loading weight is higher than the loading weight (hereinafter, referred to as the reference loading weight) at the time the reference contact length was set, the reference contact length is corrected to be longer by a quantity corresponding to the difference. When a current loading weight is lower than the reference loading weight, the reference contact length is corrected to be shorter by a quantity corresponding to the difference. An inflation pressure of the tire 6 can be thus estimated at a higher degree of accuracy. The reference loading weight may be set on the assumption that neither an occupant(s) is riding nor baggage is loaded (that is, a state where a weight of the own vehicle alone is applied to the tire) or on the assumption that one average adult is riding in the vehicle. It goes without saying that a load sensor to detect a load applied to the tire may be attached separately, so that the correspondence relation between the contact length and the inflation pressure is corrected using the detection value. In such a case, too, the reference contact length may be corrected to be longer as the detection value of the load sensor becomes larger.

According to the configuration as above, the vibration power generating element 11 detects a vibration in the tread 60 as the counter electrodes P relatively vibrate with respect to the electret electrodes E in response to a vibration in the attachment portion 61. The signal processing unit 14 and the transmitter 15 operate on power generated in the vibration power generating element 11. That is to say, the element that detects a vibration also plays a role of supplying power to drive the tire-side device 1. Hence, the need to provide a separate battery cell to drive the tire-side device 1 is eliminated. Consequently, a size of the tire-side device 1 (a member forming the tire device 100 and attached inside the tire) can be reduced. For example, in the configuration in the related art, a battery cell to drive the tire-side device occupies about half the space in the tire-side device 1. In other words, when configured as in the present embodiment, a size of the tire-side device 1 can be reduced to about the half.

In the present embodiment, the signal processing unit 14 in the tire-side device 1 performs the processing to extract information necessary to estimate tire conditions and the signal processing unit 23 in the vehicle-side device 2 performs the processing to calculate a coefficient of friction and an inflation pressure using data, such as a wheel speed. Accordingly, complex processing can be performed intensively in the signal processing unit 23 in the vehicle-side device 2.

For example, in the case of a four-wheel vehicle, it is necessary to detect conditions of the respective tires equipped to the vehicle. By selecting necessary information in the tire-side device 1 provided to each tire and sending the selected information to the vehicle-side device 2, the detection data received from the respective tire-side devices 1 can be processed efficiently at a time in the vehicle-side device 2. In other words, time and labor to perform the functions of the friction coefficient estimation unit 231 and the inflation pressure estimation unit 232 for each tire-side device 1 can be omitted.

Various functions (the road surface contact zone detection unit 141, the contact time measurement unit 144, and the high-frequency component extraction unit 142) furnished to the signal processing unit 14 in the tire-side device 1 may be furnished to the signal processing unit 23 in the vehicle-side device 2 instead. Conversely, various functions (the friction coefficient estimation unit 231 and the inflation pressure estimation unit 232) furnished to the signal processing unit 23 in the vehicle-side device 2 may be furnished to the signal processing unit 14 in the tire-side device 1 instead.

The present embodiment has described the configuration in which the movable substrate (the counter electrode substrate 11P in the present embodiment) is supported by the springs K1 by way of example. In a case where the movable substrate 11P in the vibration power generating element 11 is supported by single springs, the vibration power generating element 11 detects a vibration (and generates power) sensitive enough in response to a vibration in a particular frequency band corresponding to a spring constant of the springs. The inventors conducted various tests and discovered that a frequency of a vibration generated in the tread 60 while the vehicle is running except for at the beginning and the end of contact (namely, a vibration in the zone S2 of FIG. 4) is in a range of about 10 to 100 Hz. Hence, efficiency of power generation by the vibration power generating element 11 can be increased by designing the spring constant for an intrinsic vibration frequency of the movable substrate 11P supported by the springs to fall within the range of 10 to 100 Hz.

Modifications

The present disclosure is not limited to the embodiment described above. For example, the present disclosure can be modified or expanded as follows.

The frequency of a vibration corresponding to the zone S2 of FIG. 4 described above is influenced by a rotation speed of the tire (i.e., 1 to 20 Hz) and shapes (i.e., irregularities) and conditions (i.e., frozen or unfrozen) of the road surface. The frequency of a vibration therefore may be set to a value (i.e., 100 to 200 Hz) other than the value specified above. For example, it is anticipated that a distribution of the frequency of a vibration generated in a tread of a tire is different between a vehicle like a long-distance truck that chiefly runs on an express highway and a vehicle that chiefly runs on a dirt road surface, such as the surface of a sandy and stony road. Hence, it may be designed in such a manner that the intrinsic vibration frequency of the movable substrate 11P falls within a range of the frequency of a vibration generated in the tread 60 in the environment under which the vehicle equipped with the tire device 100 usually runs.

On the other hand, the inventors discovered from various tests they conducted that a vibration generated in the tread is in the range of 100 Hz to 10 kHz at the beginning and the end of contact and the vicinity thereof. Hence, it is preferable to have a configuration that enables the vibration power generating element 11 to be sensitive enough to also detect a vibration in the frequency band specified above. In other words, by outputting a voltage corresponding to a vibration in the frequency band specified above, the beginning and the end of contact of the attachment portion 61 during the rotational motion of the tire can be detected with good accuracy. As has been described, a vibration generated in the tread in the vicinity of the beginning and the end of contact results from deformation of the attachment portion 61 when the attachment portion 61 is compressed or freed from the compression.

Figure 6:
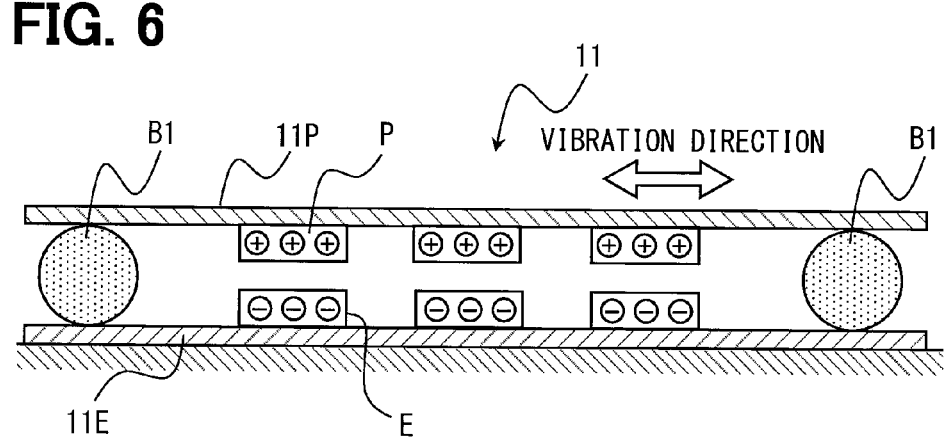
FIG. 6 is a view showing an example of the other one configuration of the vibration power generating element.

It is, however, difficult to support the configuration that allows the intrinsic vibration frequency of the movable substrate 11P to fall within the range of 10 to 100 Hz and the configuration that allows the intrinsic vibration frequency of the movable substrate 11P to fall within the range of 100 Hz to 10 kHz using single springs as described above. To overcome such a difficulty, for example, as is indicated by KX of FIG. 5, the movable substrate 11P is supported by combining two or more types of springs each having a different spring constant. When configured as above, a vibration can be detected sensitive enough in response to vibrations in different frequency bands and power can be generated efficiently. Alternatively, it may be configured in such a manner as shown in FIG. 6 that the movable substrate 11P is supported on balls or cylindrical members (B1) that rotate in a vibration detection direction with respect to the fixed substrate (the electret electrode substrate 11E herein).

What is claimed is:

1. A tire device, comprising:
a vibration power generating element that is arranged inside a tire and outputs a voltage corresponding to a time variation of a vibration generated in a tread of the tire;
a signal processing unit that is arranged inside the tire and performs signal processing on the voltage outputted from the vibration power generating element; and
a transmitter that is arranged inside the tire and sends data, which is prepared by signal-processing the output voltage, in the signal processing unit to an external device arranged outside the tire,
wherein:
the signal processing unit and the transmitter are driven by power generated in the vibration power generating element;
the vibration power generating element includes a fixed substrate fixed to the tread and a movable substrate arranged opposite to the fixed substrate and movable in a tire tangential direction with respect to the fixed substrate, and generates power with a change in a position of the movable substrate with respect to the fixed substrate; and
the movable substrate is supported by combining two or more types of springs each having a different spring constant.

2. The tire device according to claim 1, further comprising:
a contact beginning time point detection unit that detects a time point at a beginning of contact between an attachment portion, where the vibration power generating element is attached in the tread, and a road surface based on a time variation of the voltage outputted from the vibration power generating element;
a contact ending time point detection unit that detects a time point at an end of contact at a moment when the attachment portion lifts off the road surface, based on a time variation of the voltage outputted from the vibration power generating element;
a contact time measurement unit that measures a contact time interval from the time point at the beginning of contact detected by the contact beginning time point detection unit to the time point at the end of contact detected by the contact ending time point detection unit;
a wheel speed detection unit that detects a rotation speed of the tire;
a contact length calculation unit that calculates a contact length, which is a length of a segment where the tire is in contact with the road surface, based on the contact time calculated in the contact time measurement unit and the rotation speed of the tire detected in the wheel speed detection unit; and
an inflation pressure estimation unit that estimates an inflation pressure of the tire based on the contact length calculated in the contact length calculation unit.

3. The tire device according to claim 2, wherein:
the inflation pressure estimation unit stores at least one reference contact length, which is a contact length preliminarily set according to an inflation pressure of the tire, and estimates the inflation pressure of the tire by comparing the reference contact length with the contact length calculated in the contact length calculation unit.

4. The tire device according to claim 3, further comprising:
a loading weight detection unit that detects a loading weight of a vehicle,
wherein, when the loading weight of the vehicle detected in the loading weight detection unit is higher than a reference loading weight which is a preliminarily set loading weight, the inflation pressure estimation unit corrects the reference contact length to be longer; and
when the loading weight of the vehicle is lower than the reference loading weight, the inflation pressure estimation unit corrects the reference contact length to be shorter.

5. The tire device according to claim 1, further comprising:
a high-frequency component extraction unit that extracts a high-frequency component from the voltage outputted from of the vibration power generating element; and
a friction coefficient estimation unit that estimates a coefficient of friction between the road surface and the tire from a width of an amplitude of the high-frequency component extracted in the high-frequency component extraction unit.

6. The tire device according to claim 1, wherein:
the voltage outputted from the vibration power generating element is inputted into a power supply circuit including a rectifier unit and a power storage unit; and
the power supply circuit supplies power, which is inputted from the vibration power generating element, to the signal processing unit and the transmitter.

7. The tire device according to claim 1, wherein
the vibration power generating element has a structure in which an intrinsic vibration frequency of the movable substrate falls in a frequency band of a vibration generated in the tread due to rotational motion of the tire rotating at a frequency between 1 Hz and 20 Hz and irregularities of the road surface.

8. The tire device according to claim 1, wherein:
the vibration power generating element includes a fixed substrate fixed to the tread and a movable substrate arranged opposite to the fixed substrate and movable in a tire tangential direction with respect to the fixed substrate, and generates power with a change in a position of the movable substrate with respect to the fixed substrate; and
the vibration power generating element has a structure in which an intrinsic vibration frequency of the movable substrate falls in a frequency band of a vibration generated in the tread when an attachment portion, where the vibration power generating element is attached, is deformed.

9. The tire device according to claim 7, wherein:
the vibration power generating element has both of a structure in which an intrinsic vibration frequency of the movable substrate falls in a frequency band of a vibration generated in the tread due to rotational motion of the tire rotating at a frequency between 1 Hz and 20 Hz and the irregularities of the road surface, and a structure in which the intrinsic vibration frequency of the movable substrate falls in a frequency band of a vibration generated in the tread when an attachment portion, where the vibration power generating element is attached, is deformed.

* * * * *